United States Patent [19]

Spriewald et al.

[11] Patent Number: 4,664,799
[45] Date of Patent: May 12, 1987

[54] RECEIVER FOR PURIFYING LIQUIDS

[75] Inventors: Erika Spriewald; Wilhelm Eder, both of Leverkusen; Heinz Meckl, Bergisch Gladbach, all of Fed. Rep. of Germany

[73] Assignee: Agfa Gevaert Aktiengesellschaft, Leverkusen, Fed. Rep. of Germany

[21] Appl. No.: 779,997

[22] Filed: Sep. 25, 1985

[30] Foreign Application Priority Data

Oct. 6, 1984 [DE] Fed. Rep. of Germany ....... 8429484

[51] Int. Cl.⁴ .............................................. B01J 47/00
[52] U.S. Cl. .................................................. 210/288
[58] Field of Search ................ 210/288, 289, 291, 282

[56] References Cited

U.S. PATENT DOCUMENTS

| 2,024,646 | 12/1935 | Jones | 210/288 |
| 2,063,086 | 12/1936 | FitzGerald | 210/288 |
| 3,319,791 | 5/1967 | Horne | 210/288 |
| 3,335,752 | 8/1967 | Hiers et al. | 210/288 |
| 3,554,377 | 1/1971 | Miller | 210/288 |
| 3,730,349 | 5/1973 | Herrmann | 210/282 |

Primary Examiner—Ivars Cintins
Attorney, Agent, or Firm—Connolly and Hutz

[57] ABSTRACT

Receivers with a detachable seal comprising a porous compressive mass (4) substantially covering the whole base of the receiver are suitable for purifying liquids, particularly photographic processing baths.

3 Claims, 3 Drawing Figures

RECEIVER FOR PURIFYING LIQUIDS

This invention relates to a receiver for purifying liquids, particularly photographic developers.

It is known to free liquids from undesirable constituents by using purifying-active agents, for example by using adsorption resins, ion exchangers and the like. Thus it is known to use ion exchangers for purifying photographic developers in canister-shaped receivers, which contain, in the interior, inlet and outlet tubes for the developer which are firmly connected to the canister. Such a receiver suffers from the disadvantages of comparatively high costs, particularly when exchanging canisters containing purifying-active agent, for the same type of canister containing a fresh purifying-active agent.

The object of the invention is to provide receivers which can contain in a simple, cheap and effective manner, purifying-active agents for purifying liquids and which are suitable for purification of liquids in the flow process.

This object is achieved by a receiver with a detachable seal for holding purifying-active agent for purifying liquids, particularly photographic processing baths, characterised in that in the interior of the receiver (1) on the base of the receiver, a porous, compressible mass (4) is arranged which substantially covers the whole base of the receiver. This porous mass which preferably has a sponge-like structure, causes a liquid to firstly distribute itself evenly within the porous composition, before emerging into the space positioned above which contains the purifying-active agent.

Such a receiver is surprisingly outstandingly suitable for the purification of liquids with purifying-active agents. For this purpose, a purifying-active agent is placed in the receiver above the porous, compressible composition. The receiver moreover has a detachable seal. This may be either a so-called operating seal or a simple slip-on or screw-on cap so as to be able to transport and store the receiver in a safe manner with the purifying-active agent containing therein, before or after prescribed use.

The described operating seal contains an integrated inlet and outlet tube firmly connected to it. When the receiver is sealed by the operating seal, then the open end of the inlet tube extends as far as the porous compressible mass on the base of the receiver and slightly compresses this, for example by about 5 mm. The inlet tube can also have a large number of radical orifices in the form of bores or slits in the area of the porous, compressible mass, instead of a single axial orifice or in addition thereto, evenly distributed on its wall. The inner open end of the outlet tube is positioned in the upper part of the receiver, that is in the seal or close to the seal.

The seal, whether it be the transport and storage seal or the operating seal, can in a fitted state seal the receiver in a tight, particularly watertight manner; sealing means, such as sealing rings, between the receiver and the seal can optionally be used here. A firm connection between the receiver and the seal can for example be effected via a screw thread or a bayonet socket.

The receiver is preferably designated such that it has a cross-section which is almost constant over its total height. This cross section (surface) can be circular, oval or polygonal and is particularly preferably designed such that its largest diameter is not more than 50% larger. than its smallest diameter. For space-saving stacking during storage and transportation, receivers with, for example, a rectangular, particularly a square or a regular hexagonal cross-section are used. The receiver can also, however, be cylindrical in shape. The ratio of the height of the receiver to the diameter of the base of the receiver is at least 0.5:1, particularly at least 2:1 and preferably at least 5:1. The volume of the receiver is generally greater than 100 ml. For practical use, receivers with, for example, a volume of 0.5, 1, 2 or 5 l are suitable.

The receiver and the operating seal with the inlet tube and the outlet tube preferably consists of plastics material. In a preferred embodiment, at least the receiver is produced from transparent plastics material for better control of the receiver contents.

The porous, compressible mass preferably covers the total base of the receiver. It can be firmly connected to the base and preferably has a thickness of from 5 to 50 mm. When operating seal is fitted, the inlet tube preferably penetrates at least 5 mm into the porous, compressible mass, or compresses it. The compressible mass preferably consists of a foam, for example a polyurethane.

The inlet tube is preferably arranged such that the end positioned in the porous, compressible composition ends if possible in the middle of the base or close to the middle of the base. In front of the inner open end of the outlet tube and/or in the outlet tube itself, a finely meshed net or sieve can be positioned to prevent parts of the purifying active agent also being drawn off by the purified liquid.

The purifying-active agent is preferably an adsorption resin or an ion exchanger, particularly an anion exchanger. On the introduction or a used developer, these remove undesirable constituents from the developer. When using an anion exchanger, excess halide, for example, can be removed from the used developer. Surprisingly, the liquid emerging from the end of the inlet tube into the receiver distibutes itself extraordinarily evenly in the purifying-active agent during prescribed use, as soon as it emerges from the porous, compressible mas. Optimum use of the purifying-active agent is thereby guaranteed.

During prescribed use, the liquid to be purified, for example by exploiting gravity or by the effect of an applied hydrostatic pressure, is passed through the inlet tube into the receiver. The porous, compressible mass at the base of the receiver causes an optimum even distribution over the whole cross-section (surface) of the container. The liquid then moves upwards in the receiver, thus intensively contacting the purifying-active agent and is thereby purified. The purified liquid leaves the receiver through the outlet tube and can then, optionally after replenishing used constituents, be supplied for repeated use.

If the purifying-active agent is exhausted after relatively long use, it can be replaced in the simplest manner. For this, the operating seal is detached from the receiver with the exhausted purifying-active agent and placed on a new receiver with fresh purifying-active agent, from which the originally supplied transport and storage seal has previously been removed. The receiver with the exhausted purifying-active agent is sealed again by the supplied transport and storage seal and can, optionally after intermediate storage, be supplied to the waste or to a new preparation.

For better handing, it is moreover possible in a special embodiment to provide the outlet tube with an air escape device. In a preferred embodiment, the outlet tube is firmly or flexibly connected to a Y- or T-shaped connecting piece, the upper end of this connecting piece having a ventilation orifice and the other free end of the connecting piece serving to drain the purified liquid.

Reference is made to the attached Figures for explanation:

FIG. 1 shows the receiver (1) with the porous, compressible mass (4) arranged on the base of the receiver and with the fitted transport and storage seal (2). Above the porous, compressible mass (4) is the space (7) for the purifying-active agent.

Figure 1:
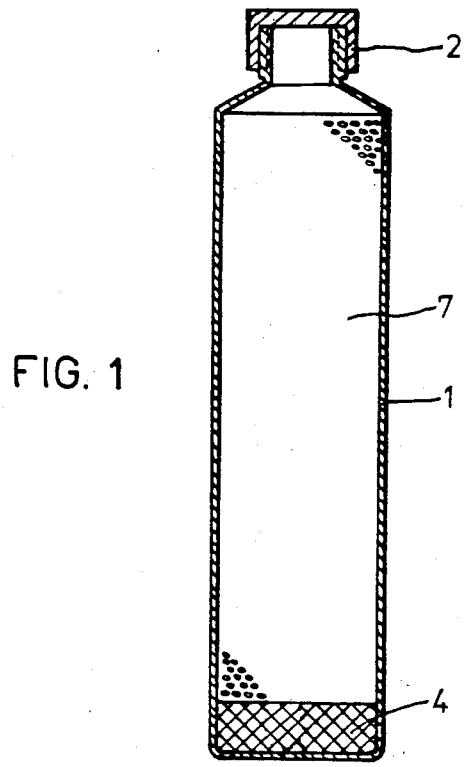
FIG. 1 shows the receiver according to the invention with the transport and storage seal
Figure 2:
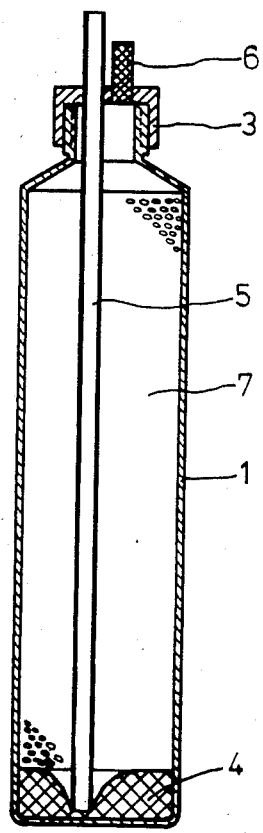
FIG. 2 shows the receiver according to the invention with the operating seal

FIG. 2 shows the receiver (1) in the operative state with the fitted operating seal (3). The inlet tube (5) and the outlet tube (6) are firmly inserted therein. The inlet tube (5) extends into the interior of the receiver (1) until it is close to the base of the receiver and slightly presses in the porous compression mass (4) arranged there. The outlet tube (6) does not extend or only slightly extends into the receiver (1). The space (7) for the purifying-active agent is positioned between the porous, compressible mass (4) and the inner orifice of the outlet tube (6).

Figure 3:
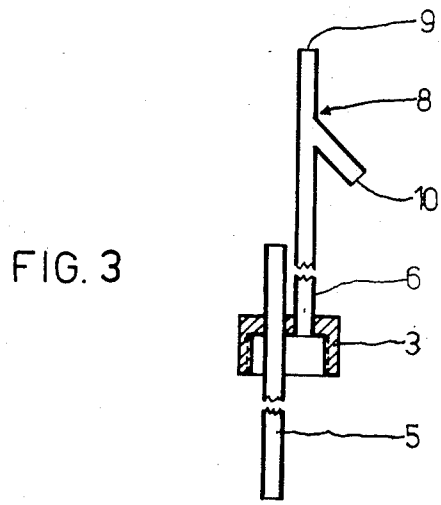
FIG. 3 shows a special embodiment of the operating seal.

FIG. 3 shows a special embodiment of the operating seal (3) with the inlet tube (5) and the outlet tube (6). The latter is connected to a Y-shaped connecting piece (8), which has a ventilation orifice (9) and an outlet orifice (10) for the purified liquid.

We claim:

1. A device for purifying liquids comprising
a receiver means for a liquid having in combination
an ion exchange means for purifying liquids contained in said receiver
a porous compressible mass within the receiver arranged across an interior receiver base surface so as to substantially cover the entire interior base surface,
a detachable seal of said receiver connected to an inlet tube extending into the interior of the receiver and having an inner open end disposed in proximity to said base surface which compresses the porous, compressible mass, and
an outlet tube extending into the receiver having an inner open end proximate the detachable seal.

2. Receiver according to claim 1, characterised in that it has a volume of at least 100 ml.

3. Receiver according to claim 1, characterised in that the ratio of the height of the receiver to the diameter is at least 0.5:1.

* * * * *